No. 786,864. PATENTED APR. 11, 1905.
S. W. WARDWELL.
SELF LUBRICATING PULLEY.
APPLICATION FILED MAR. 25, 1904.

No. 786,864. Patented April 11, 1905.

UNITED STATES PATENT OFFICE.

SIMON W. WARDWELL, OF PROVIDENCE, RHODE ISLAND, ASSIGNOR, BY MESNE ASSIGNMENTS, TO THE COMMONWEALTH TRUST COMPANY, TRUSTEE, A CORPORATION OF MASSACHUSETTS.

SELF-LUBRICATING PULLEY.

SPECIFICATION forming part of Letters Patent No. 786,864, dated April 11, 1905.

Application filed March 25, 1904. Serial No. 199,941.

*To all whom it may concern:*

Be it known that I, SIMON W. WARDWELL, residing at Providence, in the county of Providence and State of Rhode Island, have invented new and useful Improvements in Self-Lubricating Pulleys, of which the following is a specification.

My invention is a self-lubricating device for pulleys or other rotative machine members so arranged as to provide for receiving a supply of oil within the member adequate to maintain lubrication for an extended period and effectively distribute it to the bearing-surfaces.

I have preferred to describe and show my invention as adapted to a pulley of the ordinary idler class; but it will be obvious from the following description that the device might be applied with equal advantage to various other means, as gears, wheels, &c.

Figure 2:
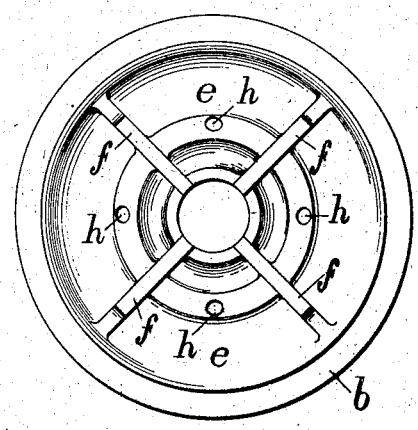
Figure 1:
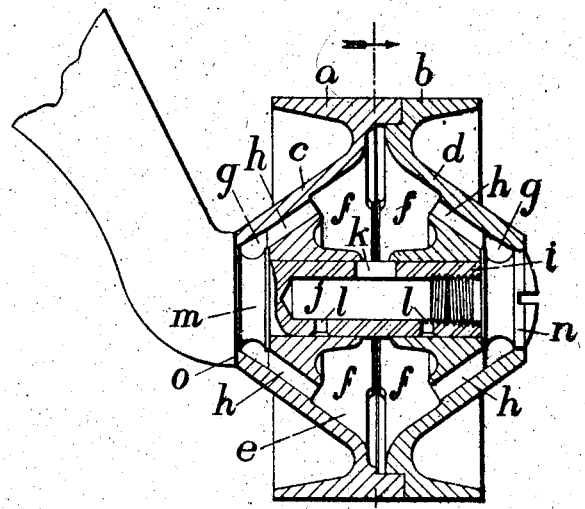

Figure 1 is a sectional view showing the arrangement of reservoir and ducts and their relation to the pulley-bearing; Fig. 2, a view of the inside of one-half the pulley, showing the diaphragm-partitions that divide the interior.

The pulley is made in two sections, $a$ and $b$, fitted one to the other with a male and female joint and tightly forced together. Each section has its own hub alining with that of the other and so disposed that when the pulley is assembled a space intervenes between the ends of the hubs. Each hub is connected with the rim by a dished or conical web, so related to both hub and rim that the webs $c$ and $d$ form the walls of an interior chamber or reservoir $e$. From each of the webs $c$ and $d$ radial ribs $f f$, &c., extend into the reservoir, the ribs of one section opposing and nearly meeting those of the other, thus dividing the reservoir into compartments, all the compartments connected through the spaces intervening between the edges of the ribs.

At the outer ends of the hubs of the pulley are formed internal V-shaped annular grooves $g g$, each groove being connected to the reservoir $e$ by four holes or ducts $h h$, &c., leading into its several compartments.

The pulley is adapted to be mounted on a bearing $i$, as shown in Fig. 1, the bearing having any suitable means of support. In the drawings I have indicated an arm extending upward from the bearing, and any suitable arrangement may be employed to fasten the arm to the machine. Again, the bearing itself might be screwed or otherwise directly fastened to the machine; but this is not material to the invention. Extending nearly the length of the bearing is an axial bore forming the oil-chamber $j$.

Located between the hubs of the pulley, upon the top of the bearing $i$, is a relatively large opening $k$, leading from the reservoir $e$ into the chamber $j$, and two smaller openings $l l$ lead out of the chamber $j$ on the under side of the bearing.

The pulley is held longitudinally on the bearing $i$ by a shouldered portion in the form of a flange or collar $m$ at one end and a headed nut or screw $n$ at the opposite extremity, the latter serving as a closure for the chamber $j$. The flange $m$ and the head of the screw $n$ are disposed within the ends of the hub of the pulley and are preferably grooved to form with the grooves $g g$ of the hub an annular oil-channel for the purpose hereinafter described. A second shoulder $o$ on the bearing $i$ extends above the flange $m$, abutting the inner end of the pulley-hub, and at the opposite end of the hub the head of the screw $n$ is substantially flush therewith, so that the arrangement presents a particularly smooth and neat appearance, with no projecting parts to gather lint and dirt.

The operation of the device for the continual lubrication of the bearings is as follows: The screw $n$ is removed by unscrewing and the oil introduced at the end of the hub in the groove $g$, whence it flows through the ducts $h h$, filling the reservoir to the level of the tops of said ducts. The screw is then replaced with its head tight against the end of the bearing $i$. After the pulley has been supplied it is turned slowly a few times before its regular rotation is started to distribute the oil in the different compartments of the reservoir. The ribs $f\ f$, &c., act as paddles to carry the oil up and around the bearing and serve still further the important function of directing the oil into the chamber $j$. In whatever position the pulley stops, one of the compartments of the reservoir will always be above the opening $k$, and the ribs $f\ f$, &c., serve to lead the oil down into the chamber $j$ to fill the latter. The chamber $j$ is designed to contain enough oil to effectively lubricate the bearings throughout the period of continuous rotation of the pulley, and whenever the pulley is stopped the chamber is again filled up. From the chamber $j$ the oil leaches out through the openings $l\ l$ directly to the bearing-surfaces of the hubs.

The end bearings of the hubs, formed by the flange $m$ and screw $n$, are close enough to prevent too free a flow of oil, that which does bleed through serving to lubricate these surfaces and being afterward confined in the annular channels at the ends of the hubs. When the pulley is rotating, centrifugal action carries the oil radially outward in the grooves $g\ g$, entraining it through the ducts $h\ h$, &c., back into the reservoir $e$ to be again used as it passes through the channels described. The tendency of gravity causes any oil reaching the ends of the bearing $i$ to be entrained through the grooves in the flange $m$ and screw $n$ to drip into the grooves $g\ g$, and whether the pulley is rotating or at rest it will eventually be returned to the reservoir $e$.

It will be seen that a continuous circulation of the lubricant is maintained from the reservoir to the bearing-surfaces and thence back to the reservoir again. The tendency is always to keep the oil away from the outside of the pulley, and as none can escape the pulley once attended will run for months without further care.

Self-oiling pulleys have previously been designed; but all those now known are open to the following disadvantages: Where sufficient oil is carried to lubricate the bearings for any extended period, it has been impossible to so contain it in the pulley as to avoid leakage. The rapid rotation of the pulley tends to throw the oil centrifugally outward from the axis, and where no means are provided to prevent its escape it will be scattered on the belts and other parts, with consequent detriment. Also when the pulley is at rest the oil will leach out through every available opening or pore. In the improved pulley above described while running the tendency of centrifugal force is always to lead the oil back into the reservoir, and when the pulley is at rest gravitation induces its return to the reservoir. The joint of the two halves of the pulley being oil-tight, no oil can possibly escape from the reservoir, and, further, the tendency being always for it to work away from the ends of the hub, the only places available for its escape, there is absolutely no leakage from the pulley. This is a most valuable feature, for it is a well-known fact that if oil is allowed to reach a belt the efficiency of the latter will be materially decreased and in time the belt will rot and be entirely spoiled. Also it is desirable in pulleys used in connection with textile machinery that the oil be kept away from the material, which would be injured by its contact.

In my device the oil cannot leak nor be thrown or spattered and never appears on the outer surface of the pulley. The least bit of oil on any part of moving machinery will gather dust and lint, and this eventually works onto the bearing-surfaces and causes wear. The pulley herein shown and described is lint and dust proof.

It will be seen that my invention comprises, essentially, the combination of a rotative member and its bearing having a peculiar arrangement and form of reservoir, ducts, and oil-channels therein, and while I have described their action in connection with a pulley it will be obvious that they are not limited to this single adaptation.

What I claim is—

1. The combination in a self-lubricating pulley of two sections, each formed with a rim portion, a hub-section, a dished web to connect the hub with the rim and radial ribs in the dished side of the web, so formed and related that when the said pulley-sections are joined, a radially-compartmented reservoir is formed.

2. The combination in a self-lubricating pulley, of two sections, each formed with a rim portion, a hub bored axially, and annularly grooved at its outer end, a dished web joining the hub to the rim portion and ducts leading from the groove to the dished side of the web.

3. The combination in a self-lubricating pulley, of two sections, each formed with a rim portion, a hub bored axially and annularly grooved, a dished web joining the hub to the rim portion, with radial ribs dividing the dished side into sections and with ducts leading from the annularly-grooved part of the hub to the said sections.

4. A self-lubricating pulley formed with an interior reservoir, radial ribs dividing said reservoir into compartments, said ribs having openings between them to connect the compartments and axially-bored and annularly-grooved hub-sections with ducts leading from the grooved portions to the compartments.

5. The combination in an oiling device of a pulley formed with an interior reservoir and radial ribs or partitions extending into the reservoir, two adjacent hub-sections axially bored and with internal annular grooves at their outer ends, and ducts leading from the grooves to the reservoir, and a bearing for the pulley formed with an axial chamber, said chamber having an opening leading from the pulley-reservoir and openings leading out to the under side of the bearing.

6. The combination in an oiling device of a pulley formed with an interior annular reservoir with radial ribs extending into the reservoir, and a bearing for the pulley formed with an axially-disposed oil-chamber, said chamber having openings into it from the pulley-reservoir and out of the chamber to the bearing-surface.

7. The combination of a pulley formed with an interior reservoir and adjacent hub-sections axially bored, and with annular grooves at the outer ends of the bores with ducts leading from the grooves into the reservoir, and a bearing for the pulley formed with an interior oil-chamber having an opening into the oil-reservoir of the pulley and openings leading to the bearing-surfaces.

8. The combination of a pulley comprising two sections, each formed with a rim portion, a hub-section, a dished web to connect the hub with the rim, and radial ribs in the dished side of the web, and a bearing for the pulley formed with an oil-chamber opening into the pulley-reservoir, and onto the bearing-surfaces, and means to locate the pulley longitudinally on the bearing.

9. The combination in a lubricating device for pulleys or other machine members, of a rotating member composed of two sections $a$ and $b$ formed with separate hub-sections having alining bores joined to form an interior reservoir $e$, said hubs having annular grooves $g$, $g$ at the outer ends of the bores and ducts $h$, $h$, leading from the grooves to the reservoir, and a bearing $i$ for the rotating member formed with an interior oil-chamber $j$, the latter having an opening $k$ leading from the reservoir $e$, and openings $l$, $l$ leading to the bearing-surfaces, there being a flange $m$ at one end of the bearing $i$, serving as an end bearing for the rotating member, and formed with a groove registering with one of the grooves $g$, and a headed screw at the opposite end of the bearing also formed with a groove to register with the other groove $g$.

10. The combination in a lubricating device for pulleys or the like of a rotating member composed of two sections $a$ and $b$, formed with separate hub-sections having alining bores, the sections joined to form an interior reservoir $e$, said hub-sections having annular grooves $g$, $g$ at the outer ends of the bores and ducts $h$, $h$, leading from the grooves to the reservoir $e$, and a bearing $i$ for the rotating member having a flange $m$ at one end, formed with an annular groove to register with one of the grooves $g$, the bearing also formed with an axial bore $j$ having an opening $k$ leading from the reservoir $e$ and openings $l$, $l$ leading to the bearing-surfaces, and a headed screw $n$ fitted to the bore $j$ and having its head formed with a groove registering with the other groove $g$.

In testimony whereof I have signed my name to this specification in the presence of two subscribing witnesses.

SIMON W. WARDWELL.

Witnesses:
JOSHUA B. HALE,
THOMAS M. CHILDS.